April 13, 1954     P. B. WEISZ ET AL     2,675,344
DECOLORIZATION PROCESS
Filed Aug. 9, 1950
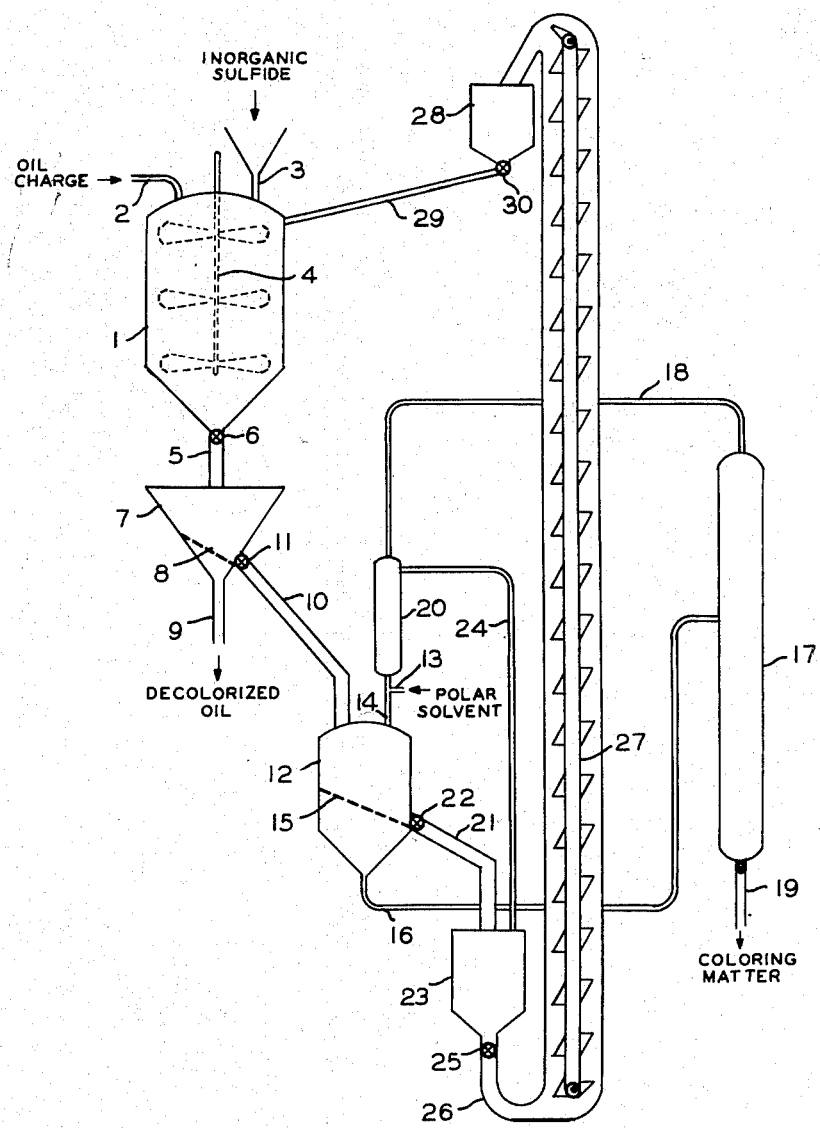
PAUL B. WEISZ
ALEXANDER N. SACHANEN
*INVENTORS*
BY *Raymond W. Barclay*
ATTORNEY Patented Apr. 13, 1954

2,675,344

UNITED STATES PATENT OFFICE 2,675,344

DECOLORIZATION PROCESS

Paul B. Weisz, Pitman, and Alexander N. Sachanen, Woodbury, N. J., assignors to Socony-Vacuum Oil Company, Incorporated, a corporation of New York Application August 9, 1950, Serial No. 178,376

14 Claims. (Cl. 196—44)

The instant invention relates to the refining of oils and other fluids. More particularly, the present invention is concerned with a method for decolorizing petroleum lubricating oils by contacting the same with a solid water-insoluble inorganic sulfide.

The coloring matter of petroleum oils, more particularly lubricating oils, is due mainly to the presence of substances of a bituminous or asphaltic nature, as well as to the presence of various complex sulfur and nitrogen compounds. In addition to these substances, coloring also is very probably due to various colloidal and dissolved impurities, such as finely divided and colloidal carbon, complex tarry compounds of high molecular weight, and the like.

The removal of substances producing color in a petroleum oil is generally understood to be dependent upon the phenomena known as adsorption. However, when a decolorizing agent is introduced into a petroleum oil, there also takes place certain changes in the oil itself that are of a chemical nature, such as polymerization of tarry, asphaltic and bituminous substances, unsaturated hydrocarbons, etc. The adsorbent, therefore, in many instances also behaves as a polymerizing agent.

The effectiveness of oil refining operations employing adsorbent materials accordingly depends upon the characteristics and properties of the adsorbent materials used. An ever present problem in the art is to develop improved adsorbents in order to obtain higher decolorization efficiency and increased commercial value in these operations. In one method for the decolorization of lubricating oils, the oil to be decolorized is agitated with a finely divided solid adsorbent material for a suitable period of time, followed by separation of the decolorized oil from the spent adsorbent mass. This contact method for decolorization of petroleum lubricating oils requires an active adsorbent in finely divided form which will not unduly affect desired properties of the lubricating oils so treated. Other desirable properties of such adsorbents are high filter-rate (i. e., the rapidity with which the oil can be filtered from the adsorbent after contact therewith), minimum tendency to cause cracking of the oil and high density.

It is an object of this invention to provide a process for decolorizing petroleum oils by contacting the same with an active adsorbent material having the aforesaid characteristics. A further object is the provision of an oil decolorizing method which is rapid and efficient, readily lending itself to commercial operation. A still further object of this invention is the provision of a process for decolorizing oil utilizing an adsorbent material capable of easy regeneration. A very important object of this invention is to provide a continuous cyclic process for decolorizing oils with an adsorbent of high color sorption capacity.

These and other objects, which will be apparent to those skilled in the art, are attained in accordance with the present invention wherein solid finely divided water-insoluble inorganic metal sulfides have been found to possess excellent capacity for sorbing color bodies from hydrocarbon oils. It has further been discovered that color bodies thus sorbed can be effectively removed by elutriation with a polar organic solvent and the color sorption capacity of the inorganic metal sulfide can thus be regenerated. It has still further been found that the color sorptive power of the sulfide adsorbents employed herein can be unexpectedly enhanced by a preliminary activating treatment thereof with excess sulfur as hereinafter described.

Broadly, the present process comprises contacting the oil to be decolorized with a finely divided solid water-insoluble metal sulfide for a suitable period of time and subsequently separating the decolorized oil from the spent sulfide particles by filtration or other feasible means. The sulfide containing sorbed color bodies may then be regenerated by elutriation of the spent sulfide with an organic polar solvent. After drying to remove solvent therefrom, the sulfide is again ready for use. In some instances, where the dried regenerated sulfide has tended to form lumps or aggregates of a size greater than that desired, it is suitably ground to requisite particle size before being re-used.

The adsorbent employed in the present process is a solid inorganic metal sulfide characterized by substantial water insolubility, large effective surface area, and ionic structure, i. e., having an electrostatic or ionic type of linkage. Suitable metal sulfides useful as adsorbents in the instant process when in the form of a finely divided powder include antimony sulfide ($Sb_2S_3$), cadmium sulfide (CdS), mercuric sulfide (HgS), lead sulfide (PbS), arsenic sulfide ($As_2S_3$), molybdenum sulfide ($MoS_2$), bismuth sulfide ($Bi_2S_3$), silver sulfide ($Ag_2S$), chromium sulfide ($Cr_3S_4$), iron sulfide ($Fe_3S_4$), copper sulfide (CuS), manganese sulfide (MnS), cobalt sulfides (CoS and $Co_2S_3$), nickel sulfide (NiS), thorium sulfide ($ThS_2$), zinc sulfide (ZnS) and stannic sulfide (SnS$_2$). The foregoing list is not to be considered as limiting but merely representative of the inorganic sulfide adsorbent contemplated for use in the instant decolorizing process. Of the numerous metal sulfides tested, preference is accorded those of metals found in group IIb of the periodic table, namely, the sulfides of zinc, cadmium, and mercury. While many of the above-recited sulfides are relatively expensive in initial cost in comparison to known decolorizers, such as clays, silica gel, and the like, nevertheless the efficient decolorization attained with present sulfide adsorbents, together with the fact that they may be readily regenerated with substantially complete recovery thereof, make them attractive from a commercial standpoint.

The conditions under which the instant process is carried out may vary widely, depending upon the nature of the oil stock undergoing treatment and the particular inorganic sulfide adsorbent employed. In general, however, the oil to be decolorized is contacted with finely divided adsorbent of powder size, having a comparatively large effective surface area of at least about 1 square meter per gram of solid, for a sufficient period of time to effect substantial removal of color bodies contained therein. The duration of such contact is dependent upon the relative proportions of oil and adsorbent present as well as upon the degree of discoloration of the oil and the sorbent power of the particular adsorbent used. As a general rule, the larger the amount of adsorbent present, the shorter is the contact time required. Under the usual conditions of practicing the process of this invention, however, the contact period will generally range from about 2 to about 300 minutes. In order to bring about a more effective contact between the finely divided adsorbent and oil stock, the mixture is ordinarily agitated by stirring, shaking, or other means during the aforementioned period. Such treatments are effected at substantially atmospheric pressure and may be carried on at atmospheric or higher temperatures generally not exceeding about 200° C. The quantity of adsorbent employed may be of the order of from about 1% to about 50% or more by weight based on the quantity of oil treated, depending upon the nature of the oil to be treated and upon the qualities desired in the resulting decolorized product. The decolorized oil is thereafter separated from the spent sulfide particles by filtration, centrifuging, or other suitable means.

The adsorbent containing sorbed color bodies may then be regenerated by elutriation with an organic polar solvent. The solvents useful for this purpose should possess at least some mutual solubility with the oil undergoing treatment and should be sufficiently volatile to be completely separable from the oil by distillation at relatively low temperatures. The solvent employed should be polar in nature since the color bodies removed from the adsorbent therewith are polar. The reason for mutual solubility of solvent and oil resides in the necessity for the polar solvent to penetrate and work off layers of oil adhering to the sulfide adsorbent. The elutriation will generally be carried out at atmospheric temperatures, although in some instances slightly elevated temperatures not exceeding the boiling point of the particular solvent employed may be helpful in facilitating the removal of color bodies. In particular, it has been found that the lower alcohols and ketones may be used with advantage as elutriants for the sorbed coloring matter. Thus, ethyl, isopropyl, butyl, amyl, and isoamyl alcohols and such ketones as acetone, methyl-ethyl ketone, and methyl-isopropyl ketone may be used advantageously. These solvents, together with other polar solvents having the above-defined characteristics, may be used either alone or in combination to provide an effective elutriant medium for regenerating the spent adsorbent by removing sorbed color bodies therefrom.

The adsorbent thus regenerated may be used for further contact decolorization after being dried. The solvent solution containing the coloring matter previously removed is treated to effect recovery of the solvent. Such treatment ordinarily involves fractionating the solution of coloring matter driving the solvent therefrom as overhead and obtaining the coloring bodies as residue. Solvent vapor, removed as overhead, is condensed and may then, if desired, be used for further elutriation of the spent adsorbent.

It has additionally been found, in accordance with this invention, that the color sorptive power of the sulfide adsorbents described hereinabove can be enhanced by a preliminary activating treatment with excess sulfur. The method for effecting such activation involves contacting the sulfide adsorbent with sulfur either in vapor form or in the form of a solution such as ammonium polysulfide. Such contact may take place at atmospheric temperatures or at slightly elevated temperatures ordinarily not exceeding about 100° C. The period of contact is such as to deposit an appreciable amount of sulfur on the surface of the sulfide adsorbent and generally is between about 2 and 100 minutes. It is thereafter advantageous, but not essential, in obtaining the activating effect, to remove at least a part of the excess surface sulfur thus introduced by washing with a solvent having appreciable solubility for sulfur, such as pyridine. This subsequent washing step has been found to yield a sulfide adsorbent of distinctly improved color sorption capacity, as will be shown hereinafter.

The process described above is conveniently adaptable to continuous operation and a suitable system for carrying out such operation is shown in the attached drawing. Referring more particularly to the drawing, it will be seen that the oil charge to be treated is conducted into mixing tank 1 through conduit 2. The inorganic sulfide adsorbent is led into the mixing tank via conduit 3. The tank is provided with a propellor agitator 4 which serves to intimately admix the oil and adsorbent. After thorough admixture has been attained, the resulting oil-adsorbent slurry is conducted through outlet pipe 5 provided with control valve 6 into filter vessel 7. There, the decolorized oil is separated from the adsorbent by passing through a slanted filter plate 8 and is removed from filter vessel 7 by means of pipe 9. The spent adsorbent collecting on filter plate 8 moves by gravity through conduit 10, the flow being suitably controlled by valve 11, and passes into tower 12. Polar solvent introduced into tower 12 through pipes 13 and 14 flows through the spent adsorbent contained in the tower and resting on slanted filter plate 15. The solvent in flowing through the bed of adsorbent removes sorbed color bodies therefrom. A stream of solvent containing the color bodies so removed is conducted from the bottom of tower 12 through outlet conduit 16 and is led into fractionating column 17. The column is maintained at a temperature such that the solvent passes overhead as vapor through pipe 18 while the coloring matter previously removed from the oil and the adsorbent collects in the bottom of column 17 and is periodically removed therefrom through pipe 19. The solvent vapor flowing through pipe 18 passes through condenser 20 wherein the solvent vapor is condensed. Liquid solvent ensuing from condenser 20 is recycled to tower 12 through pipe 14.

The adsorbent so regenerated in tower 12 moves by gravity from filter plate 15 through conduit 21, the rate of flow being controlled by valve 22 and passes into drier 23. Solvent adhering to the adsorbent is driven off in the drier and passes overhead as a vapor through pipe 24 to condenser 20. The dried regenerated adsorbent passes from the bottom of drier 23, the rate of passage being suitably controlled by valve 25. The dried adsorbent then flows through conduit 26 where it is picked up by belt conveyor 27 and carried to storage bin 28. From bin 28, the adsorbent may be recycled through conduit 29 to tank 1, the rate of flow being suitably regulated by control valve 30.

Having described the nature of this invention, the following specific, but non-limiting, examples will serve to illustrate the improved results attained in accordance with the instant process:

Example 1

A solvent-refined Oklahoma City distillate in the amount of 50 grams was contacted with 2.5 grams of cadmium sulfide powder. The duration of the contact was 60 minutes and the temperature was 22° C. The oil was thereafter separated from the cadmium sulfide adsorbent by filtration and tested for color.

The oil before contact with the cadmium sulfide had a color (Lovibond) of 7.2 and after contact a color (Lovibond) of 3.5.

This example illustrates that the use of even a comparatively small amount of sulfide adsorbent gives rise to a distinct improvement in oil coloration.

Example 2

A coastal distillate was diluted with 5 parts of white oil to one part of distillate for experimental convenience. One hundred grams of the oil blend having a color equivalent to 21.4 on the Lovibond scale was contacted with 50 grams of finely divided cadmium sulfide. The contact was for a period of 5 minutes at a temperature of 70° C. Thereafter, the oil was removed from the sulfide adsorbent by filtration.

The spent cadmium sulfide was washed in iso-amyl alcohol by contacting the 50-gram sample with 100 grams of the alcohol for 5 minutes at 70° C. Then, the regenerated sulfide, after drying by evaporation of the alcohol, was again contacted with 100 grams of the fresh oil blend under conditions described above. After removal of the spent sulfide, the process was repeated for a third complete cycle. The results of color-testing the original oil stock and the oil after each of the above contacts are set forth below:

| | Color (Lovibond) |
|---|---|
| Original oil stock | 21.4 |
| After first contact | 2.9 |
| After second contact | 2.7 |
| After third contact | 2.4 |

This example illustrates the high efficiency of the sulfide adsorbent after regeneration thereof and is exemplary of results to be obtained using a continuous cyclic operation.

Example 3

An acid-refined coastal distillate in the amount of 100 grams was contacted with 50 grams of cadmium sulfide powder for 5 minutes and at a temperature of 70° C. After separation of the oil from the sulfide by filtration, it was found to have a color (Lovibond) of 1.3. The color (Lovibond) of the original oil stock was 2.8.

This example illustrates that even with a comparatively light-colored oil a marked improvement can be obtained employing the sulfide adsorbent of the instant invention.

Example 4

Five grams of cadmium sulfide powder were mixed with 50 grams of flowers of sulfur. The mixture was heated to 110° C. for 5 minutes. Thereafter, excess surface sulfur was removed by washing with 200 c. c. of pyridine.

The cadmium sulfide so treated, after having been dried, was contacted with an Oklahoma City refined oil using 2.5 grams of the sulfide for 50 grams of the oil. The contact was for 60 minutes and at a temperature of about 20° C. Subsequent filtration yielded an oil having a Lovibond color of 2.1. The color (Lovibond) of the original oil was 7.4. Untreated cadmium sulfide in a similar contact yielded an oil having a color (Lovibond) of 3.1.

This example is illustrative of the activating effect obtained upon treating the sulfide adsorbent with excess sulfur. It will be noted that while a distinct improvement in color of the oil was realized upon contacting with ordinary sulfide adsorbent, a still further improvement in color was obtained by bringing the oil into contact with a sulfide adsorbent which had undergone preliminary treatment with sulfur.

Example 5

Fifty grams of cadmium sulfide were immersed in and agitated with 125 c. c. of ammonium-disulfide [$(NH_4)_2S_2$] for a period of 15 minutes at a temperature of 22° C. The cadmium sulfide was thereafter removed by filtration and washed with ammonium monosulfide [$(NH_4)_2S$] for 5 minutes at 22° C. to remove a substantial portion of surface sulfur.

The cadmium sulfide so treated, after being dried, was contacted with an Oklahoma City refined oil using 2.5 grams of the treated sulfide for 50 grams of the oil. The contact was carried out at about 20° C. and for one hour. Filtration of the adsorbent-oil slurry yielded an oil having a color (Lovibond) of 2.5. The color (Lovibond) of the original oil was 7.4. Cadmium sulfide adsorbent which had not undergone any preliminary treatment with ammonium disulfide employed in a similar contact gave an oil having a color (Lovibond) of 3.1.

This example illustrates that an activated sulfide adsorbent having high color sorptive capacity can be obtained by a preliminary treatment of the sulfide with sulfur in the form of ammonium disulfide.

Example 6

Two and one-half grams of the activated cadmium sulfide adsorbent employed in Example 5 were washed with 50 grams of pyridine over a period of 5 minutes and at a temperature of 22° C. to remove additional portions of sulfur excess.

The resulting sulfide, after being dried, was employed in an oil decolorizing contact identical with that of Example 5. The oil, having an original color (Lovibond) of 7.4, after said contact showed a color (Lovibond) of 2.2.

This example illustrates that a subsequent washing of the activated sulfide adsorbent of Example 5 with a solvent having appreciable solubility for sulfur, such as pyridine, further increases the color sorptive capacity of such adsorbent.

Example 7

A solvent-refined Oklahoma City distillate having a color (Lovibond) of 7.2 was contacted with finely divided mercuric sulfide. The solid weight-to-oil-volume ratio was 0.2 gram solid per cubic centimeter of oil stock. The contact was carried out at a temperature of 22° C. for a period of 5 minutes. Thereafter, the oil was removed by filtration and upon testing was found to have a color (Lovibond) of 3.2.

This example illustrates the improved color qualities obtained in an oil upon contacting the same with an adsorbent of mercuric sulfide.

Example 8

A solvent-refined Oklahoma City distillate having a color (Lovibond) of 7.2 was contacted with antimony trisulfide powder. The solid weight-to-oil-volume ratio was 0.2 gram solid per cubic centimeter of oil stock. The contact was effected at a temperature of 22° C. and for a period of 5 minutes. The oil, after removal from the adsorbent by filtration, was found to have a color (Lovibond) of 1.2.

This example illustrates the improved color qualities obtained in an oil upon contacting the same with an adsorbent of antimony trisulfide.

Example 9

A solvent refined Oklahoma City distillate having a color (Lovibond) of 7.2 was contacted with finely divided cadmium sulfide powder. The solid weight-to-oil-volume ratio was 0.2 gram solid per cubic centimeter of oil stock. The contact was effected at a temperature of 22° C. and for a period of 5 minutes. The oil, after removal from the adsorbent by filtration, was found to have a color (Lovibond) of 2.5.

From the foregoing examples, it will be seen that the solid water-insoluble inorganic metal sulfides in finely divided form possess high color sorptive capacity for removing color bodies from mineral oils.

The process of this invention has been found to be particularly valuable in improving the color of Mid-Continent and Coastal petroleum stocks but may be applied in improving the color of oils from practically any source, for example, untreated petroleum distillates or residuums and treated oils; clay-treated oils; solvent-treated oils; oils produced by hydrogenation; oils produced by cracking; and oils produced by various synthetic or polymerization methods.

It is, accordingly, to be understood that the above description is merely illustrative of preferred embodiments of the invention of which many variations may be made within the scope of the following claims by those skilled in the art without departing from the spirit thereof.

We claim:

1. A method for removing color bodies from a petroleum lubricating oil containing the same, which consists of contacting said oil in the liquid state with a solid water-insoluble inorganic metal sulfide at a temperature between about 20° C. and about 200° C. and separating the oil so treated from said sulfide.

2. A method for removing color bodies from a petroleum lubricating oil containing the same, which comprises bringing said oil in the liquid state into contact with cadmium sulfide at a temperature between about 20° C. and about 200° C. and thereafter separating the oil from said sulfide.

3. A method for removing color bodies from a petroleum lubricating oil containing the same, which consists of bringing said oil in the liquid state into contact with antimony trisulfide at a temperature between about 20° C. and about 200° C. and thereafter separating the oil from said sulfide.

4. A method for removing color bodies from a petroleum lubricating oil containing the same, which comprises bringing said oil in the liquid state into contact with mercuric sulfide at a temperature between about 20° C. and about 200° C. and thereafter separating the oil from said sulfide.

5. A method for decolorizing a petroleum lubricating oil comprising contacting said oil in the liquid state at a temperature between about 20° C. and about 200° C. with a finely divided solid water-insoluble inorganic metal sulfide which has undergone preliminary treatment with excess sulfur and thereafter separating the oil from said sulfide.

6. A method for decolorizing a petroleum lubricating oil comprising contacting said oil in the liquid state with a finely divided solid water-insoluble inorganic metal sulfide at a temperature between about 20° C. and about 200° C., said sulfide having been activated by a preliminary treatment with sulfur vapor and thereafter separating the oil from said sulfide.

7. A method for decolorizing a petroleum lubricating oil comprising contacting said oil in the liquid state with a finely divided solid water-insoluble inorganic metal sulfide at a temperature between about 20° C. and about 200° C., said sulfide having been activated by a preliminary treatment with ammonium disulfide and thereafter separating the oil from said sulfide.

8. A method for decolorizing a petroleum lubricating oil comprising contacting said oil in the liquid state with a finely divided solid water-insoluble inorganic metal sulfide at a temperature between about 20° C. and about 200° C., said sulfide having been activated by a preliminary treatment with excess sulfur, followed by washing with a sulfur solvent and thereafter separating the oil from said treated sulfide.

9. A method for decolorizing a petroleum lubricating oil comprising contacting said oil in the liquid state with a finely divided solid water-insoluble inorganic metal sulfide at a temperature between about 20° C. and about 200° C., said sulfide having been activated by a preliminary treatment with excess sulfur, followed by washing with pyridine and thereafter separating the oil from said treated sulfide.

10. A continuous process for removing color bodies from a petroleum lubricating oil containing the same, which comprises contacting said oil in the liquid state with a solid water-insoluble inorganic metal sulfide at a temperature between about 20° C. and about 200° C., filtering the decolorized oil from said sulfide, elutriating the spent sulfide with a polar solvent, drying the sulfide so regenerated, recycling the regenerated sulfide to further contact with the original oil, separating the solvent solution of color bodies and recycling said separated solvent to contact with the aforesaid spent sulfide.

11. A continuous process for removing color bodies from a petroleum lubricating oil containing the same, which comprises contacting said oil in the liquid state with cadmium sulfide at a temperature between about 20° C. and about 200° C., filtering the decolorized oil from said sulfide, elutriating the spent sulfide with a polar solvent, drying the sulfide so regenerated, recycling the regenerated sulfide to further contact with the original oil, separating the solvent solution of color bodies and recycling said separated solvent to contact with the aforesaid spent sulfide.

12. A continuous process for removing color bodies from a petroleum lubricating oil containing the same, which comprises contacting said oil in the liquid state with mercuric sulfide at a temperature between about 20° C. and about 200° C., filtering the decolorized oil from said sulfide, elutriating the spent sulfide with a polar solvent, drying the sulfide so regenerated, recycling the regenerated sulfide to further contact with the original oil, separating the solvent solution of color bodies and recycling said separated solvent to contact with the aforesaid spent sulfide.

13. A continuous process for removing color bodies from a petroleum lubricating oil containing the same, which comprises contacting said oil in the liquid state with antimony trisulfide at a temperature between about 20° C. and about 200° C., filtering the decolorized oil from said sulfide, elutriating the spent sulfide with a polar solvent, drying the sulfide so regenerated, recycling the regenerated sulfide to further contact with the original oil, separating the solvent solution of color bodies and recycling said separated solvent to contact with the aforesaid spent sulfide.

14. A method for removing color bodies from a petroleum lubricating oil containing the same, which comprises contacting said oil at a temperature between about 20° C. and about 200° C. with a solid decolorizing medium consisting of a water-insoluble inorganic metal sulfide and thereafter separating the oil so treated from said sulfide.

References Cited in the file of this patent

UNITED STATES PATENTS

| Number | Name | Date |
|---|---|---|
| 1,742,020 | Ackerman | Dec. 31, 1929 |
| 1,882,146 | Holmes | Oct. 11, 1932 |
| 1,970,282 | Day | Aug. 14, 1934 |
| 2,102,878 | Benedict | Dec. 21, 1937 |
| 2,282,514 | Fischer et al. | May 12, 1942 |